(12) United States Patent
Merrill et al.

(10) Patent No.: US 8,677,585 B2
(45) Date of Patent: Mar. 25, 2014

(54) ALIGNMENT MECHANISM FOR ASSEMBLY OF A DIFFUSER INSIDE A PRESSURE REDUCING AND CONDITIONING VALVE

(75) Inventors: Peter K. Merrill, Raynham, MA (US); Donald F. Foisy, Glendale, RI (US)

(73) Assignee: Dresser, Inc., Addison, TX (US)

( * ) Notice: Subject to any disclaimer, the term of this patent is extended or adjusted under 35 U.S.C. 154(b) by 728 days.

(21) Appl. No.: 12/859,887

(22) Filed: Aug. 20, 2010

(65) Prior Publication Data

US 2012/0042492 A1 Feb. 23, 2012

(51) Int. Cl.
*B23P 19/04* (2006.01)

(52) U.S. Cl.
USPC ......... 29/213.1; 29/890.124; 29/464; 29/466; 29/271; 137/315.01; 137/315.41

(58) Field of Classification Search
USPC .............. 29/890.124, 426.2, 464, 466, 213.1, 29/271, 281.1; 137/15.01, 15.17, 315.01, 137/315.41; 138/37, 40
See application file for complete search history.

(56) References Cited

U.S. PATENT DOCUMENTS

| | | | |
|---|---|---|---|
| 3,150,447 A * | 9/1964 | Gill | .................................. 30/96 |
| 6,715,505 B2 | 4/2004 | Higuchi | |
| 6,742,773 B2 | 6/2004 | Higuchi | |

OTHER PUBLICATIONS

"Dresser Masoneilan Control Valves & Instrumentation SteamForm 84000 Series Steam Conditioning Solutions": [online] [Retrieved on Jul. 29, 2010]; Retrieved from the Internet URL:http://www.dressermasoneilan.com/documents//LiteratureLibrary/engineered/brochures/BT84000-SteamForm-0806-0409-web.pdf.

"Dresser Masoneilan Putting You in Control Condensed Catalog": [online] [Retrieved on Jul. 29, 2010]; Retrieved from the Internet URL: http://www.dressermasoneilan.com/documents/LiteratureLibrary/TD7000-CondensedCatalog0310.pdf.

* cited by examiner

*Primary Examiner* — David Bryant
*Assistant Examiner* — Ryan J Walters
(74) *Attorney, Agent, or Firm* — Hiscock & Barclay LLP (57) ABSTRACT

An alignment mechanism is used for assembly of a diffuser inside a pressure reducing and conditioning valve, said valve having a body, an inlet port, an outlet port, a pressure reducing section between the ports, and a diffuser in an internal cavity of the pressure reducing section. The alignment mechanism comprises at least one alignment assembly having an alignment port disposed in the valve body in the pressure reducing section. The port has a passageway passing through an outer wall of the valve, and has a removable closure member adapted to close one end of the passageway. A removable alignment rod is adapted to be inserted through the passageway in the alignment port to contact an outer surface of the diffuser when the diffuser is inserted into the internal cavity of the pressure reducing section of the valve. A method of use of the alignment assembly is disclosed.

8 Claims, 8 Drawing Sheets

SECTION C-C

SECTION A-A
FIG. 2B

ALIGNMENT MECHANISM FOR ASSEMBLY OF A DIFFUSER INSIDE A PRESSURE REDUCING AND CONDITIONING VALVE

TECHNICAL FIELD

This document describes an alignment mechanism for assembly of a diffuser inside a pressure reducing and conditioning valve.

BACKGROUND

Pressure reducing and conditioning valves are sometimes installed in a centerline horizontal position. These valves can range to in excess of 15 feet long and weigh several thousand pounds. When maintenance is performed, massive internal components are generally removed horizontally through the body/bonnet access. Removal of the components is generally not a concern because alignment is not an issue.

However, during the re-assembly process stable alignment is critical. In order to ensure proper alignment, complete assemblies of valve internals are assembled prior to installation. Creating complete assemblies of valve internals can create problems because the techniques used to join the valve components may be detrimental to the materials used in the construction of the valve, or require larger valve containments. Additionally, handling these assemblies may be limited by their size and mass.

SUMMARY

In a first aspect, an alignment mechanism is used for assembly of a diffuser inside a pressure reducing and conditioning valve, said valve having a body, an inlet port, an outlet port, a pressure reducing section disposed between the inlet and outlet ports, and a generally cylindrical shaped diffuser with said diffuser disposed in an internal cavity of the pressure reducing section. The alignment mechanism comprises at least one alignment assembly, said alignment assembly having an alignment port disposed in the valve body in the pressure reducing section. The port has a passageway passing through an outer wall of the body of the valve in the pressure reducing section, and has a removable closure member adapted to close a first end of the passageway. A removable alignment rod is adapted to be inserted through the passageway in the alignment port and contact an outer surface of the generally cylindrical shaped diffuser when the diffuser is inserted into the internal cavity of the pressure reducing section of the valve.

Various implementations can include all, some, or none of the following to features. The generally cylindrical diffuser can include an open upstream end with an outwardly disposed circumferential flange and a curved closed downstream end, said outwardly disposed flange being adapted to be received in a circular groove in the internal cavity. The removable closure member of the alignment assembly can comprise a blind flange with openings for receiving flange bolts there through, an outwardly disposed circumferential flange on the alignment port, and flange bolts disposed in said flange, said bolts positioned in alignment with the openings in the blind flange. The alignment rod can be cylindrical in shape with a distal end having a tapered to a rounded point adapted to contact an outer wall of the diffuser, when the alignment rod is inserted through the passageway in the alignment port. A portion of an exterior surface of the alignment rod can be threaded with male threads, and a portion of the passageway through the port can have female threads adapted to receive the male threads on the alignment rod. The valve can have a central longitudinal axis, and a principal axis of the alignment assembly can intersect the central longitudinal axis of the valve. The alignment mechanism can include a second alignment assembly wherein a principal axis of the second alignment assembly can intersect the central longitudinal axis of the valve, and wherein the principal axis of the first alignment assembly and the principal axis of the second alignment assembly can be in a plane perpendicular to the longitudinal axis of the valve, and the axis of the first and second alignment assembly can be spaced apart in said plane from about 30 to 90 degrees. The principal axis of the first alignment assembly and the principal axis of the second alignment assembly can each be disposed at an equal acute angle from a line of action of the force of gravity that passes through the intersection of the principal axis and the principal axis when the longitudinal centerline of the valve is generally horizontal.

In another aspect, a method of assembly of a pressure reducing and conditioning valve comprises providing a pressure reducing and conditioning valve, said valve having a body, a removable bonnet, an inlet port, an outlet port, a pressure reducing section disposed between the inlet and outlet ports, said pressure reducing section having an internal cavity adapted to receive a generally cylindrical shaped diffuser. A first alignment assembly is provided having an alignment port disposed in the valve body in the pressure reducing section, said port having a passageway passing through an outer wall of the body of the valve in the pressure reducing section, said port further being adapted to receive a removable closure member for closing a first end of the passageway. The removable bonnet is removed, and said diffuser is inserted into the cavity in the pressure reducing section. A removable alignment rod is inserted through the passageway in the alignment port, and a distal end of alignment rod is brought into contact with an outer surface of the generally cylindrical shaped diffuser after the diffuser is inserted into the internal cavity of the pressure reducing section of the valve. The diffuser is secured in the cavity in the pressure reducing section, the bonnet is installed, the removable alignment rod is removed from the valve, and a closure member is installed to close a first end of the passageway in alignment port.

Various implementations include some, all, or none of the following features. Inserting the removable alignment rod through the passageway in the alignment port can further include engaging a portion of an exterior surface of the alignment rod that is threaded with male threads with a portion of the passageway that has female threads adapted to receive the male threads on the alignment rod. The alignment rod can be rotated to adjust the position of the diffuser within the cavity. Installing the closure member can comprise installing a blind flange with openings for receiving flange bolts on an outwardly disposed circumferential flange of the alignment port, said flange having flange bolts disposed therein, said openings in the blind flange positioned in alignment with the flange bolts in the circumferential flange of the alignment port, and installing threaded connectors to secure the blind flange to the circumferential flange of the alignment port. A second alignment assembly can be provided, wherein the valve has a central longitudinal axis, and a principal axis of the first alignment assembly intersects the central longitudinal axis of the valve and a principal axis of the second alignment assembly intersects the central longitudinal axis of the valve, and wherein the principal axis of the first alignment assembly and the principal axis of the second alignment assembly are in a plane perpendicular to the longitudinal axis of the valve, and the axes of the first and second alignment assemblies are spaced apart in said plane from about 30 to 90 degrees. Securing the diffuser in place can include securing an outwardly disposed circumferential flange on an open upstream end of the diffuser in a circular groove in the internal cavity with a retaining cage.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

Like reference symbols in the various drawings indicate like elements.

DETAILED DESCRIPTION OF ILLUSTRATIVE EMBODIMENTS

Figure 1A:
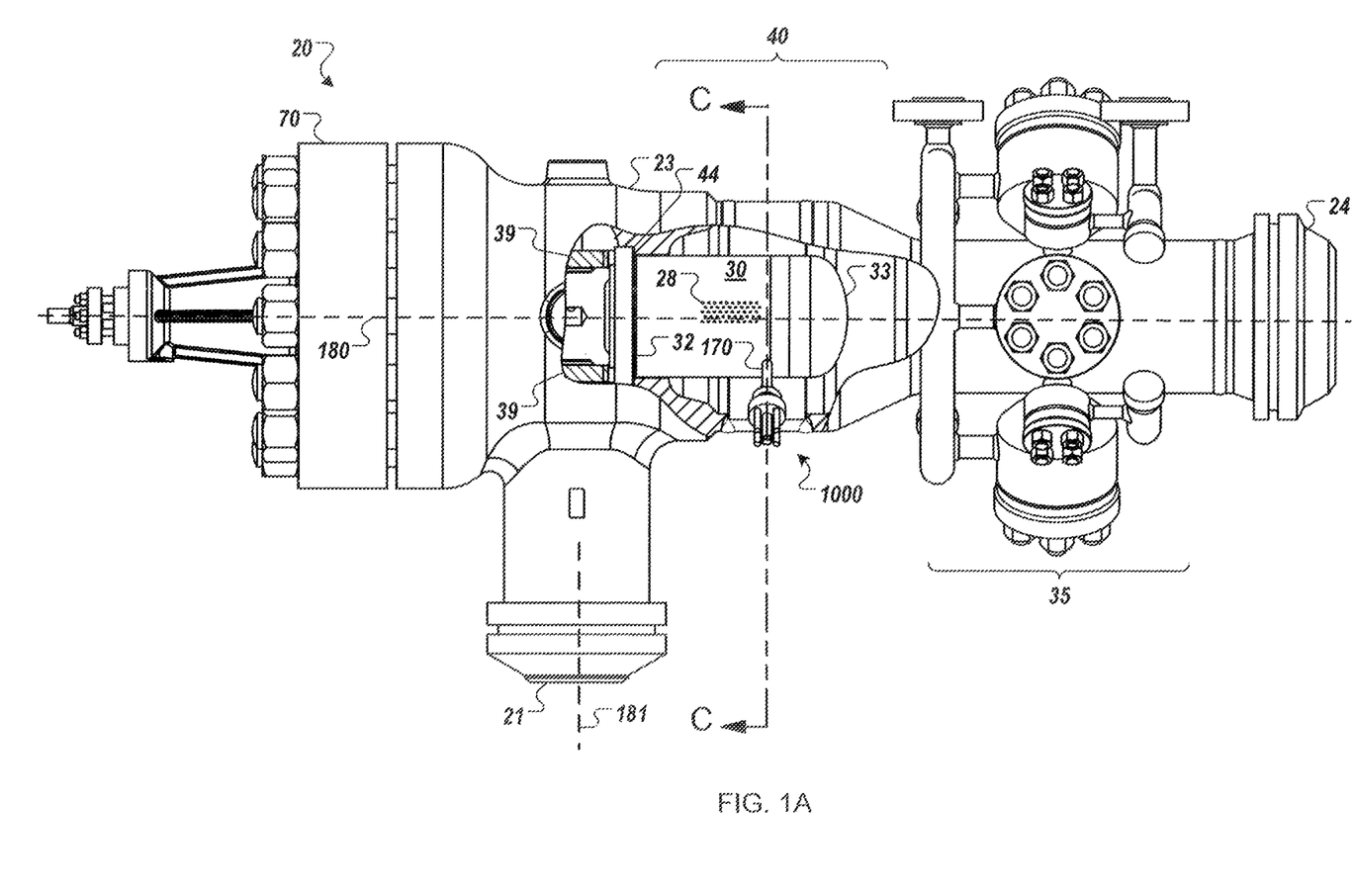
FIG. 1A shows an exemplary pressure reducing and conditioning valve with a cutaway side view illustrating a removable alignment rod installed.
Figure 1B:
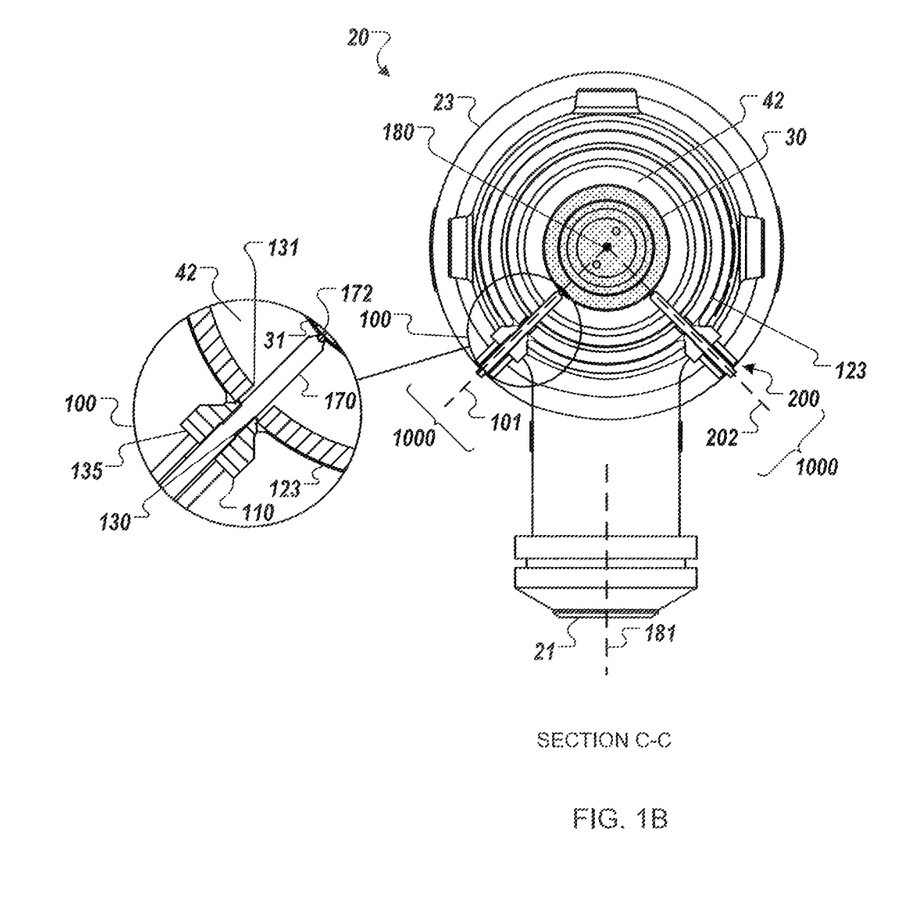
FIG. 1B shows a cross-sectional view of the pressure reducing and conditioning valve of FIG. 1A.

FIGS. 1A and 1B show side cutaway and cross-sectional views of an example of a pressure reducing and conditioning valve 20 with a removable alignment rod 170 installed. In some examples, the configuration of the valve 20 shown in FIGS. 1A-1B can be a configuration used during assembly, disassembly, maintenance, or other work being performed on the valve 20. In general terms, the valve 20 has a valve body 23, and includes a generally cylindrical shaped diffuser 30 that is positioned along a longitudinal axis 180. During proper assembly (e.g., after maintenance), the diffuser 30 needs to be held in position relative to the valve body 23. In some embodiments, however, the diffuser 30 and the valve body 23 can be large and heavy, thereby making it difficult to maintain proper alignment during assembly, especially in installations where the valve 20 is oriented horizontally. To maintain the position of the diffuser 30 within the valve body 23, an alignment mechanism 1000 that includes at least one alignment assembly 100 is disposed in a position radially outward from the diffuser 30. In some embodiments, a second alignment assembly 200 is disposed in a position radially outward from the diffuser 30. An alignment rod 170 is threaded through the alignment assembly 100 to contact the diffuser 30 and hold it in place during assembly. Later, the alignment rod 170 is removed, and the alignment assembly 100 is sealed with a blind flange 151 (see FIGS. 2B and 3B).

Referring back to FIGS. 1A and 1B, the valve 20 includes a cylindrical body 23 provided with a first port 21 for introducing a superheated steam, a second port 24 for discharging de-superheated and depressurized steam, and a bonnet 70 that includes components used for adjusting the flow of steam through the body 23. The body 23 is provided with a pressure reducing section 40 for depressurizing the superheated steam, and a moisture supply section 35 for de-superheating by injecting droplets of subcooled water into the vapor having passed through this pressure reducing section 40. It will be understood by those skilled in the art that vaporization of the subcooled water droplets will lower the temperature (de-superheat) the steam.

The pressure reducing section 40 comprises, as shown in FIG. 1A, a diffuser 30 having small holes 28 scattered around a cylindrical body. The diffuser 30 further includes an open upstream end 32 and a curved closed downstream end 33, and is structured to depressurize superheated steam by passing the steam through the diffuser 30 and transforming it into an annular flow of vapor along the inner wall of the body 23.

The moisture supply section 35 includes nozzles (not shown) for supplying atomized subcooled water ("moisture") in the longitudinal direction of the body 23 and in several stages longitudinally in the vapor flow direction. U.S. Pat. Nos. 6,715,505 and 6,742,773 describe in detail some embodiments of the moisture supply section 35, the disclosure of which is incorporated by reference.

In operation, the superheated steam inflowing from a first port 21 passes through the open upstream end 32 into the diffuser 30, and exits the diffuser 30 through the small holes 28 along the inner wall of the body 23. The steam then passes through the moisture supply section 35, is supplied with moisture from the moisture supply section 35, and is then discharged as de-superheated and depressurized steam from the second port 24.

Located in the valve body 23, radially about the diffuser 30 are the alignment assembly 100 and an alignment assembly 200 (not shown in this view). FIG. 1B shows a cross-sectional view of the pressure reducing and conditioning valve 20, the alignment assembly 100, and the alignment assembly 200, taken along sectional line C-C. In some embodiments, the alignment assembly 200 is substantially similar to the alignment assembly 100.

The alignment assembly 100 includes an alignment port 110. The alignment rod 170 is inserted through a passageway 130 in the alignment port 110 and through an opening 131 in an outer wall 123 of the valve body 23. The alignment rod 170 is cylindrical in shape, with a distal end 172 having a rounded, tapered point. The distal end 172 of the alignment rod 170 is adapted to contact an outer wall 31 of the diffuser 30 when the alignment rod 170 is inserted through the passageway 130 and through an internal cavity 42 in the pressure reducing section 40. In some embodiments, the point is sufficiently rounded so as to substantially prevent the point from becoming lodged in the small holes 28.

The valve 20 has a central longitudinal axis 180, and a principal axis 101 of the alignment assembly 100 intersects the central longitudinal axis 180 of the valve 20. A principal axis 202 of the alignment assembly 200 also intersects the central longitudinal axis 180 of the valve. The principal axis 101 and the principal axis 202 are in a plane perpendicular to the longitudinal axis 180 of the valve 20, and the axes 101 and 202 are spaced apart in said plane from about 30 to about 90 degrees. In some embodiments, the pressure reducing and conditioning valve 20 may have one or more additional alignment assemblies substantially similar to the alignment assemblies 100 and 200, spaced radially around the diffuser 30.

Figure 2A:
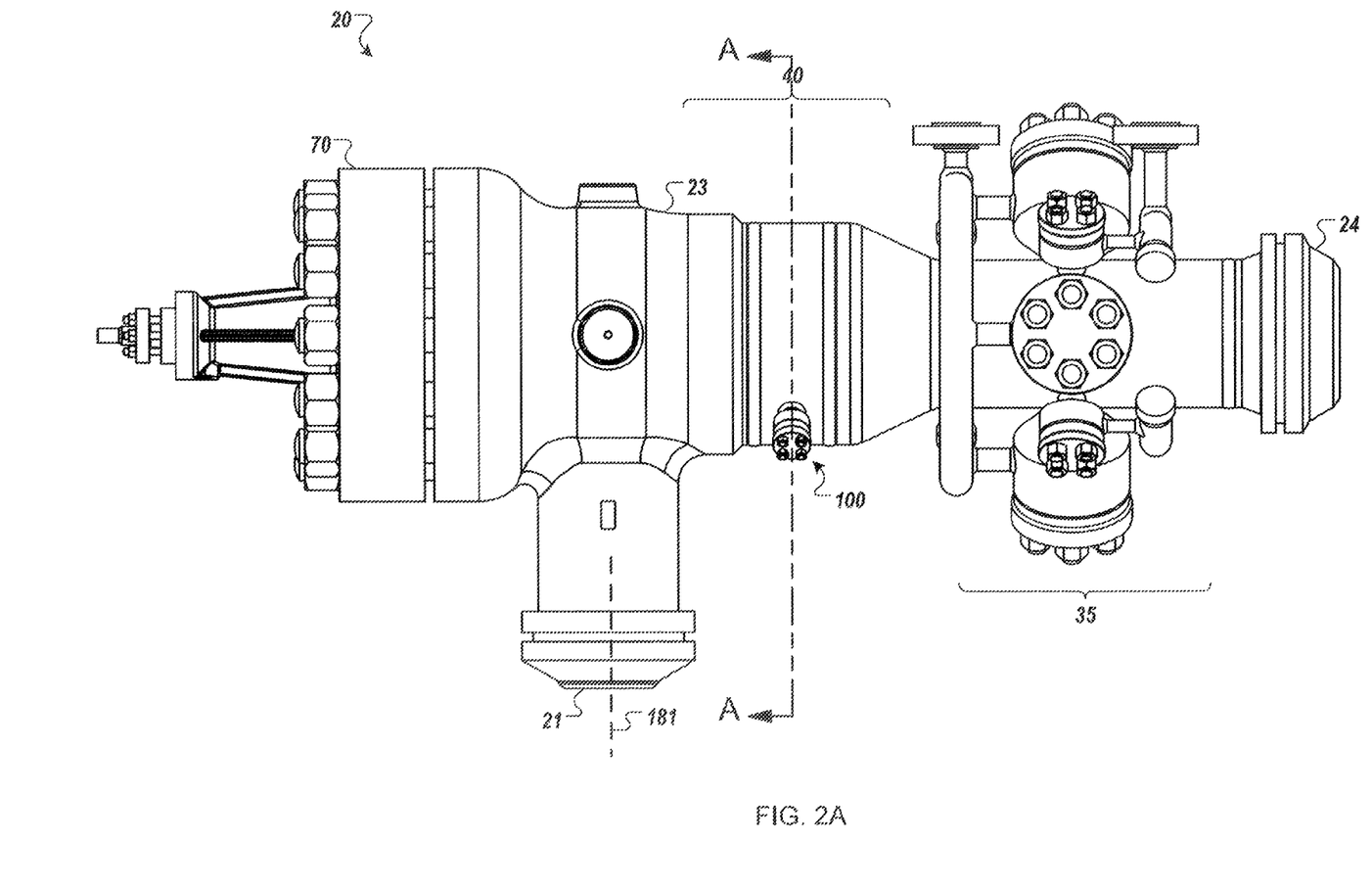
FIG. 2A shows an exemplary pressure reducing and conditioning valve with the removable alignment rod removed and removable closure member in place.
Figure 2B:
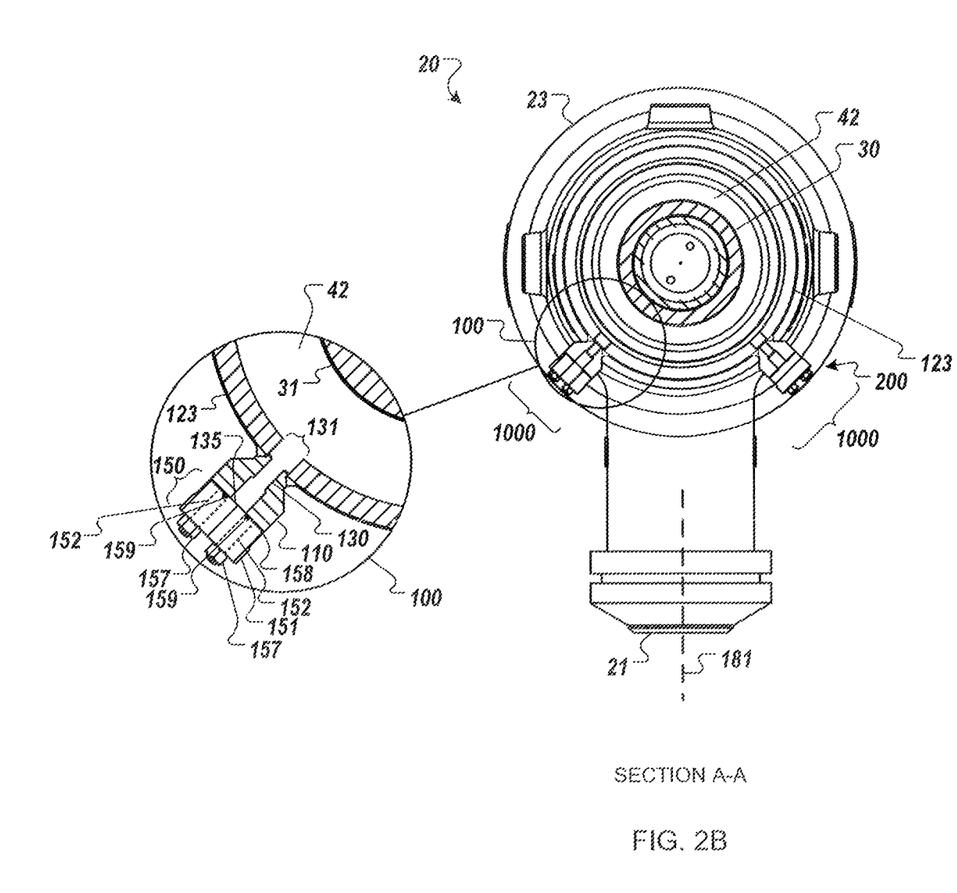
FIG. 2B shows a cross-sectional view of the pressure reducing and conditioning valve of FIG. 2A.

FIG. 2A shows a side view of the pressure reducing and conditioning valve 20 with the removable alignment rod 170 removed and a removable closure member 150 in place. In some examples, the configuration shown in FIGS. 2A-2B can be a normal operating configuration of the valve 20. FIG. 2B shows a cross-sectional view of the pressure reducing and conditioning valve 20. In the present example, the alignment rod 170 has been removed from the alignment assembly 100, leaving the passageway 130 open.

To prevent steam, flowing through the internal cavity 42, from escaping through the opening 131 and the passageway 130, the removable closure member 150 adapted to close a first end 135 of the passageway 130, is assembled to the alignment assembly 100. The removable closure member 150 includes a blind flange 151 with a collection of openings 152 for receiving a collection of flange bolts 156. In use, the blind flange is assembled to the alignment assembly 100 by passing the flange bolts 156 through the openings 152, and bringing the blind flange 151 into contact with an outwardly disposed circumferential flange 158. A gasket 159 seals gaps between the blind flange 151 and the circumferential flange 158 to prevent the escape of steam through the alignment port 110. A collection of nuts 157 are threaded on the flange bolts 156 and tightened, thereby compressing the gasket 159 and holding the removable closure member 150 in position relative to the alignment assembly 100. The alignment assembly 200 includes a removable closure member 150 and is similarly sealed.

Figure 3A:
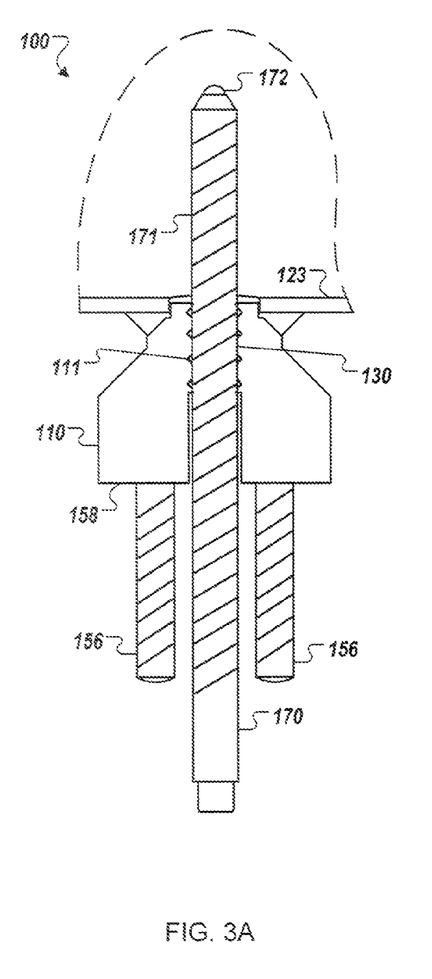
FIG. 3A shows a sectional side view of an example alignment port with the removable alignment rod installed.

FIG. 3A shows a sectional side view of an example alignment port 110 with the removable alignment rod 170 installed. In this view the removable alignment rod 170 can be seen to include a collection of male threads 171. A portion of the passageway 130 includes a collection of female threads 111 configured to receive the male threads 171 on the alignment rod 170.

Figure 3B:
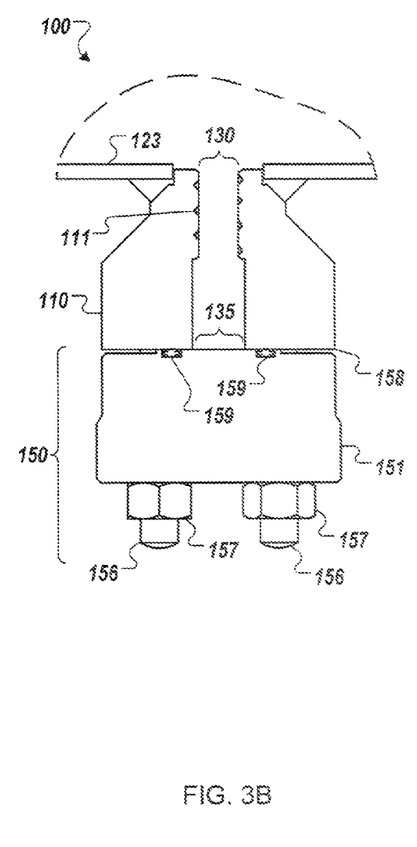
FIG. 3B shows a sectional side view of an example alignment port of FIG. 3A with the removable alignment rod removed and removable closure member in place.

FIG. 3B shows a sectional side view of the alignment assembly 100 with the removable alignment rod 170 removed. In this view, the removable closure member 150 is shown assembled to the alignment assembly 100. For example, the blind flange 151 has been slipped over the flange bolts 156 and fastened with the nuts 157, bringing the blind flange 151 and the gasket 159 into sealable contact with the circumferential flange 158, thereby preventing the passage of steam through the alignment port 110.

Figure 4A:
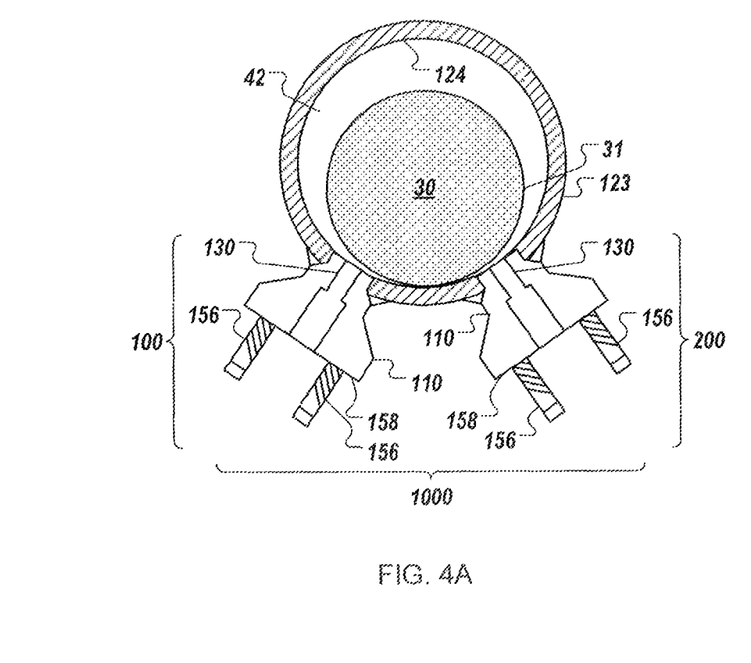
FIGS. 4A and 4B show two cross-sectional views of a pressure reducing and conditioning valve prior to the insertion of removable alignment rods.
Figure 4B:
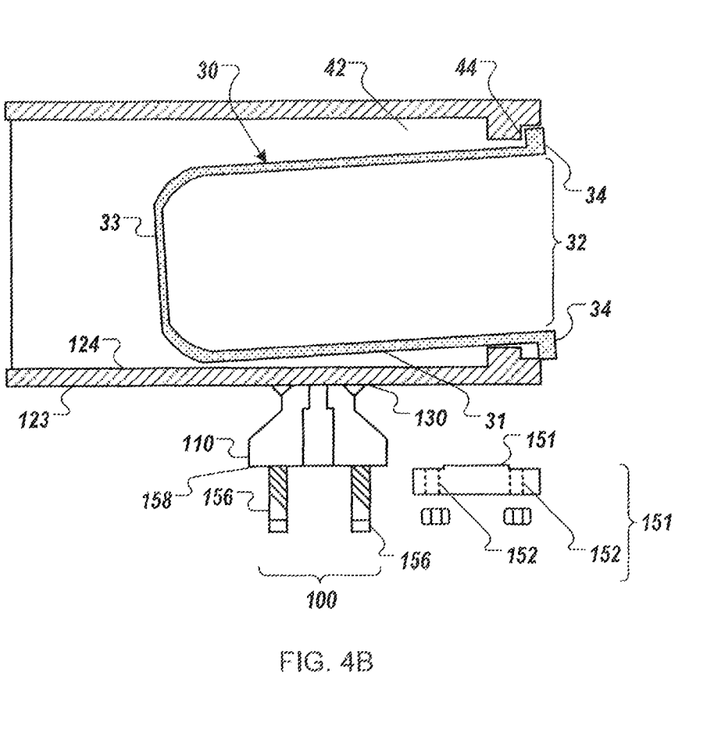

FIGS. 4A and 4B show two cross-sectional views of the pressure reducing and conditioning valve 20 prior to the installation of two of the removable alignment rods 170. The generally cylindrical diffuser 30 includes an open upstream end 32 with an outwardly disposed circumferential flange 34 and a curved closed downstream end 33. A circular groove 44 is formed in the outer wall 123 of the valve body 23 to accept the outwardly disposed flange 34.

Since the diffuser is substantially unsupported within the internal cavity 42, the closed downstream end 33 drops such that the diffuser 30 contacts the inner surface 124 of the valve body 23. As such, the diffuser 30 is not in proper alignment for assembly and operation of the valve 20. For example, the outwardly disposed flange 34 cannot rest within the circular groove 44.

Figure 4C:
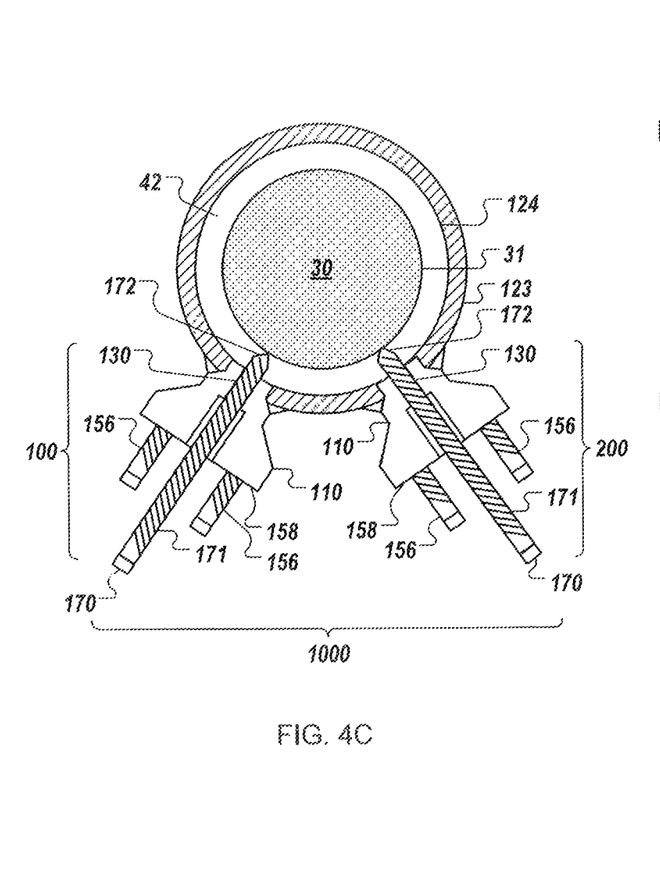
FIGS. 4C and 4D show two cross-sectional views of a pressure reducing and conditioning valve with removable alignment rods installed.
Figure 4D:
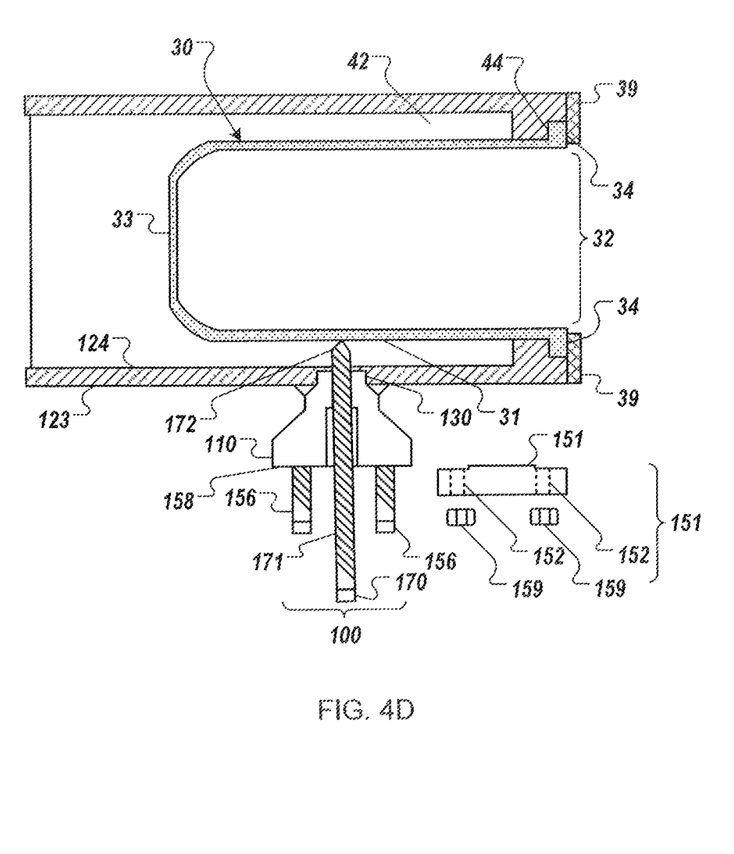

FIGS. 4C and 4D show two cross-sectional views of the pressure reducing and conditioning valve 20 with two of the removable alignment rods 170 installed. In these views, it can be seen that two or more of the alignment ports 110 and alignment rods 170 can be used to position the diffuser 30 during an assembly or disassembly process.

In operation of the alignment assemblies 100 and 200, two of the alignment rods 170 are threaded through the alignment ports 110 such that the distal ends 172 of the rods 170 contact the outer wall of the diffuser 30. As such, the alignment rods 170 assist with alignment of the diffuser 30 in the internal cavity 42 along the longitudinal axis 180 of the valve 20 and provide support within the internal cavity 42 for the diffuser 30 during assembly of other components of the valve 20. The alignment rods 170 are adjustably threaded and unthreaded to bring the diffuser into alignment such that the outwardly disposed flange 34 rests within the circular groove 44. For example, the alignment rods 170 can be rotated to adjust the position of the diffuser 30 within the internal cavity 42.

A retaining cage 39 is assembled to the valve body 23, thereby retaining the circumferential flange 34 in the circular groove 44 and holding the diffuser 30 in place. Additional assembly steps can include assembling the bonnet 70 (not shown in these figures) at or near the open upstream end 32. In some embodiments, substantially full retention of the diffuser 30 can be achieved when the bonnet 70 is secured to the valve body 23.

With the assembly of the valve 20 sufficiently complete so as to secure the diffuser 30 in place within the internal, cavity 42 without the continued need of the alignment rods 170, the alignment rods 170 can be removed. With the alignment rods 170 removed, passageways 130 of the alignment assemblies 100 and 200 are then sealed by assembling the removable closure members 150 to the alignment ports 110.

Figure 5:
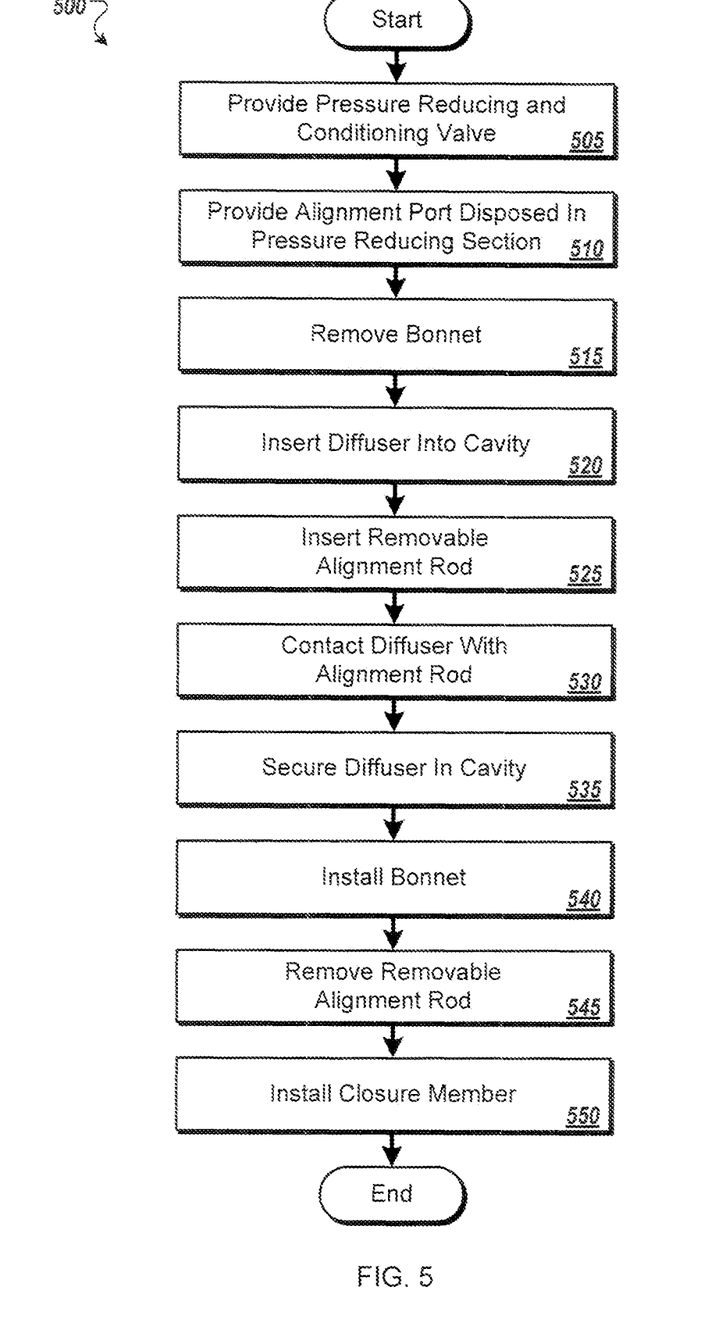
FIG. 5 is a flow diagram of an example process for using an alignment mechanism for assembling the pressure reducing and conditioning valve.

FIG. 5 is a flow diagram of an example of a process 500 for using an alignment assembly 100 for assembling a pressure reducing and conditioning valve. The pressure reducing and conditioning valve includes a body, a removable bonnet, an inlet port, an outlet port, and a pressure reducing section disposed between the inlet and outlet ports. In some implementations, the pressure reducing and conditioning valve can be the valve 20 as illustrated and described in FIGS. 1A, 1B, 2A, 2B, 3A, 3B, and 4A to 4D.

At 505, a pressure reducing and conditioning valve (e.g., the valve 20) is provided. The pressure reducing section includes an internal cavity adapted to receive a generally cylindrical shaped diffuser.

At 510, an alignment port (e.g., the alignment port 110), disposed in the pressure reducing section (e.g., the pressure reducing section 40) of the valve, is provided. The port includes a passageway (e.g., the passageway 130) passing through an outer wall (e.g., the outer wall 123) of the body of the valve in the pressure reducing section. The alignment port is formed to receive a removable closure member (e.g., the closure member 150) for closing a first end (e.g., the end 135) of the passageway.

At 515, the bonnet (e.g., the bonnet 70) and any valve internals are removed, and at 520 a diffuser (e.g., the diffuser 30) is inserted into the cavity in the pressure reducing section. At 525, a removable alignment rod (e.g., the alignment rod 170) is inserted through the passageway in the alignment port. In some embodiments, insertion of the alignment rod can be performed by threading threads (e.g., the threads 171) formed on the alignment rod into mating threads (e.g., the threads 111) formed about the walls of the passageway.

At 530, the outer surface (e.g., the outer surface 31) of the diffuser is contacted by a distal end (e.g., the end 172) of the alignment rod after the diffuser is inserted into the internal cavity of the pressure reducing section of the valve. In some implementations, by contacting the diffuser with the alignment rods, the diffuser can be aligned or otherwise favorably positioned within the internal cavity in an orientation that eases reassembly of the valve. For example, the alignment rod can be rotated to adjust the position of the diffuser within the cavity.

At 535, the diffuser is aligned in the pressure reducing section. For example, the removable alignment rod can be rotated to adjustably position and align the diffuser. In some embodiments, a retaining cage such as the retaining cage 39 can be assembled to the valve body once the diffuser has been substantially aligned. At 540 the bonnet is installed onto the valve body. For example, a bonnet such as bonnet 70 can be assembled to the valve body to substantially secure the diffuser in place.

With the diffuser substantially aligned and secured, the removable alignment rod is removed from the valve at 545. At 550, a closure member (e.g., the closure member 150) is installed to close a first end (e.g., the end 135) of the passageway in the alignment port (e.g., 110). In some embodiments, installing the closure member can include installing a blind flange (e.g., the blind flange 151) with openings (e.g., the openings 152) for receiving flange bolts (e.g., the flange bolts 156). The bolts can extend axially outward from an outwardly disposed circumferential flange (e.g., the flange 158) of the alignment port. The openings in the blind flange can be positioned to align with the flange bolts in the circumferential flange of the alignment port, and threaded connectors (e.g., the nuts 159) can be threaded onto the flange bolts to secure the blind flange to the circumferential flange of the alignment port.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. An alignment mechanism used for assembly of a diffuser inside a pressure reducing and conditioning valve, said valve having a body, an inlet port, an outlet port, a pressure reducing section disposed between the inlet and outlet ports, and a generally cylindrical shaped diffuser with said diffuser disposed in an internal cavity of the pressure reducing section, said alignment mechanism comprising:
    a first alignment assembly, said first alignment assembly having:
        an alignment port disposed in the body of the valve in the pressure reducing section, said alignment port having a passageway passing through an outer wall of the body of the valve in the pressure reducing section, said alignment port further having a removable closure member adapted to close a first end of the passageway; and
    a removable alignment rod adapted to be inserted through the passageway in the alignment port and to contact an outer surface of the generally cylindrical shaped diffuser when the generally cylindrical shaped diffuser is inserted into the internal cavity of the pressure reducing section of the valve.

2. The alignment mechanism of claim 1, wherein the generally cylindrical shaped diffuser includes an open upstream end with an outwardly disposed circumferential flange and a curved closed downstream end, said outwardly disposed flange adapted to be received in a circular groove in the internal cavity.

3. The alignment mechanism of claim 1, wherein the removable closure member of the alignment assembly comprises:
    a blind flange with openings;
    an outwardly disposed circumferential flange on the alignment port; and
    flange bolts disposed in said outwardly disposed circumferential flange, said bolts positioned in alignment with the openings in the blind flange.

4. The alignment mechanism of claim 1, wherein the alignment rod is cylindrical in shape with a distal end having a tapered portion terminating at a rounded point adapted to contact an outer wall of the generally cylindrical shaped diffuser when the alignment rod is inserted through the passageway in the alignment port.

5. The alignment mechanism of claim 1, wherein a portion of an exterior surface of the alignment rod is threaded with male threads and a portion of the passageway through the alignment port has female threads adapted to receive the male threads on the alignment rod.

6. The alignment mechanism of claim 1, wherein the valve has a central longitudinal axis, and wherein a principal axis of the first alignment assembly intersects the central longitudinal axis of the valve.

7. The alignment mechanism of claim 6, further including a second alignment assembly, wherein a principal axis of the second alignment assembly intersects the central longitudinal axis of the valve, wherein the principal axis of the first alignment assembly and the principal axis of the second alignment assembly are in a plane perpendicular to the central longitudinal axis of the valve, and wherein the principle axes of the first and second alignment assemblies are spaced apart in said plane from about 30 degrees to about 90 degrees.

8. The alignment mechanism of claim 7, wherein the principal axis of the first alignment assembly and the principal axis of the second alignment assembly are each disposed at an equal acute angle from a line of action of the force of gravity that passes through a point where the principal axis of the first alignment assembly intersects with the principal axis of the second alignment assembly when the central longitudinal axis of the valve is generally horizontal.

\* \* \* \* \*